United States Patent
Hirano (10) Patent No.: US 9,537,408 B2
(45) Date of Patent: Jan. 3, 2017

(54) POWER CONVERSION WITH CONTROLLED PHASE DIFFERENCE AND DUTY RATIO

(71) Applicant: Toyota Jidosha Kabushiki Kaisha, Toyota-shi Aichi-ken (JP)

(72) Inventor: Takahiro Hirano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 127 days.

(21) Appl. No.: 14/641,616

(22) Filed: Mar. 9, 2015

(65) Prior Publication Data

US 2015/0263632 A1 Sep. 17, 2015

(30) Foreign Application Priority Data

Mar. 11, 2014 (JP) .................................. 2014-048200

(51) Int. Cl.
*H02M 3/335* (2006.01)

(52) U.S. Cl.
CPC ..... *H02M 3/33546* (2013.01); *H02M 3/33584* (2013.01); *H02M 3/33592* (2013.01); *Y02B 70/1475* (2013.01)

(58) Field of Classification Search
CPC ..................... H02M 3/33584; H02M 3/33553; H02M 3/33546; H02M 3/33538; H02M 3/33542
See application file for complete search history.

(56) References Cited

U.S. PATENT DOCUMENTS

| | | | |
|---|---|---|---|
| 9,042,125 B1* | 5/2015 | Wambsganss | H02M 3/3376 363/21.02 |
| 2011/0198933 A1 | 8/2011 | Ishigaki et al. | |
| 2014/0237280 A1* | 8/2014 | Muto | G06F 1/3293 713/323 |
| 2016/0087545 A1* | 3/2016 | Higaki | H02J 7/0054 363/17 |

FOREIGN PATENT DOCUMENTS

| | | |
|---|---|---|
| JP | 2002-034238 A | 1/2002 |
| JP | 2011-193713 A | 9/2011 |

\* cited by examiner

*Primary Examiner* — Harry Behm
(74) *Attorney, Agent, or Firm* — Dinsmore & Shohl LLP (57) ABSTRACT

A power conversion method of a power conversion apparatus including plural primary side ports disposed in a primary side circuit and a secondary side port disposed in a secondary side circuit magnetically coupled to the primary side circuit through a transformer, the method adjusting transmission power transmitted between the primary and secondary side circuits by changing a phase difference between switching of the primary and secondary side circuits, and changing a first duty ratio of the switching of the primary side circuit or a second duty ratio of the switching of the secondary side circuit, the method including: determining whether a value obtained by dividing the phase difference by 360° is greater than a third duty ratio; and setting the second duty ratio to be equal to or greater than the value obtained by dividing the phase difference by 360° when the value is greater than the third duty ratio.

10 Claims, 6 Drawing Sheets

POWER CONVERSION WITH CONTROLLED PHASE DIFFERENCE AND DUTY RATIO

INCORPORATION BY REFERENCE

The disclosure of Japanese Patent Application No. 2014-048200 filed on Mar. 11, 2014 including the specification, drawings and abstract is incorporated herein by reference in its entirety.

BACKGROUND OF THE INVENTION

1. Field of the Invention

The present invention relates to a power conversion apparatus and a power conversion method.

2. Description of Related Art

A power conversion apparatus is known which adjusts transmission power transmitted between a primary side conversion circuit including a plurality of primary side ports and a secondary side conversion circuit including a plurality of secondary side ports and being magnetically coupled to the primary side conversion circuit through a transformer according to a phase difference $\phi$ (for example, see Japanese Patent Application Publication No. 2011-193713 (JP 2011-193713 A)).

The transmission power that is adjusted according to the phase difference $\phi$ is affected by a value of a duty ratio D of switching of the primary conversion circuit or the secondary conversion circuit.

However, since the phase difference $\phi$ and the duty ratio D are independently controlled, if there is no period during which ON time of a switching element of the primary side conversion circuit and ON time of a switching element of the secondary side conversion circuit overlap, the transmission power may decrease even the phase difference $\phi$ increases.

SUMMARY OF THE INVENTION

Therefore, an aspect of the invention is to suppress a decrease of the transmission power.

According to an aspect of the invention, there is provided a power conversion method of a power conversion apparatus including a plurality of primary side ports disposed in a primary side circuit and a secondary side port disposed in a secondary side circuit that is magnetically coupled to the primary side circuit through a transformer, the power conversion method adjusting transmission power by changing a phase difference between switching of the primary side circuit and switching of the secondary side circuit, the transmission power being transmitted and adjusted between the primary side circuit and the secondary side circuit, the power conversion method changing a first duty ratio of the switching of the primary side circuit or a second duty ratio of the switching of the secondary side circuit, the power conversion method including: a determination step of determining whether a value obtained by dividing the phase difference by 360 degrees is greater than a third duty ratio; and a setting step of setting the second duty ratio of the secondary side circuit to be equal to or greater than the value obtained by dividing the phase difference by 360 degrees when the value obtained by dividing the phase difference by 360 degrees is greater than the third duty ratio.

According to the aspect of the invention, it is possible to suppress the decrease of the transmission power.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Configuration of Power Supply Apparatus 101

Figure 1:
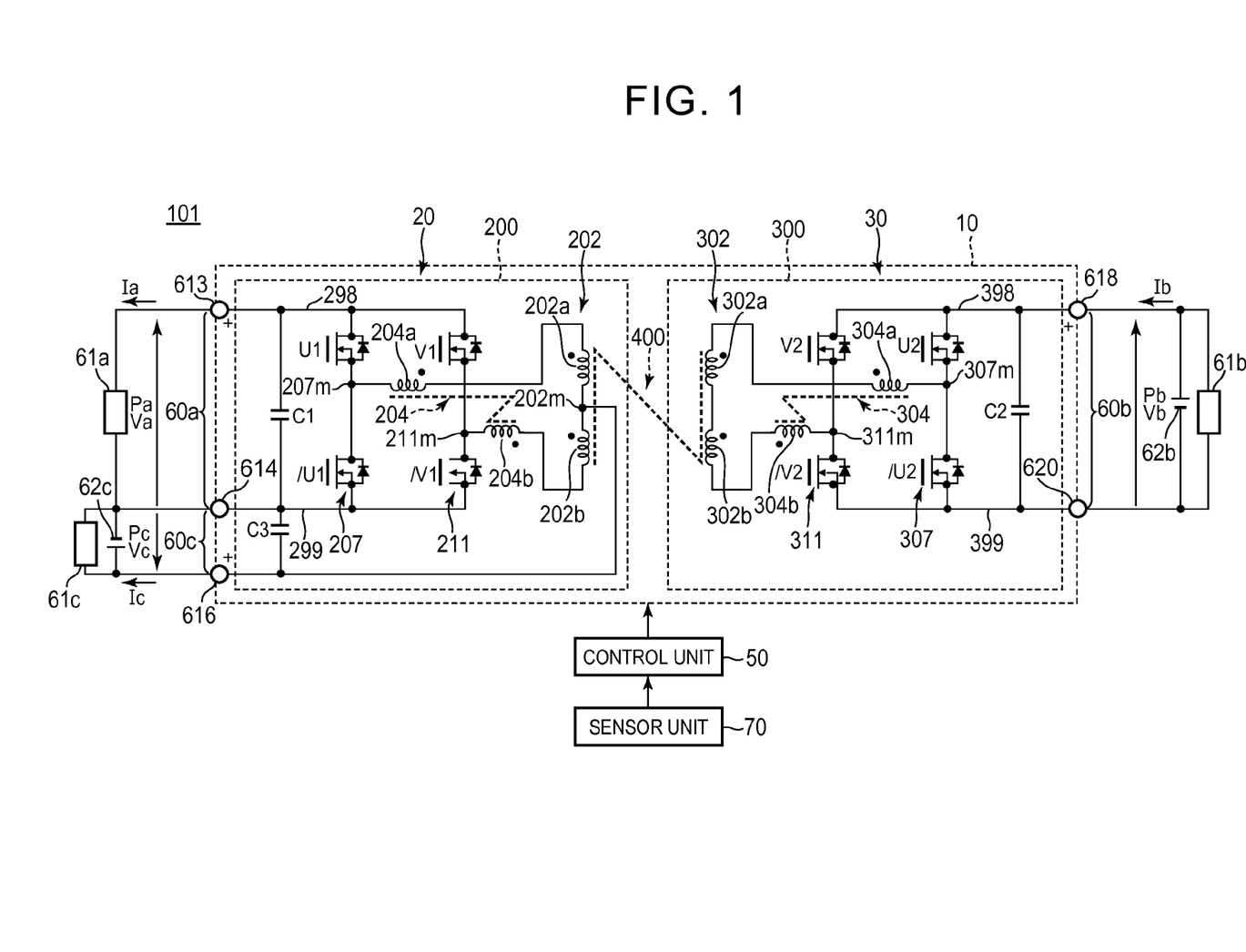
FIG. 1 is a block diagram illustrating a configuration example of a power supply apparatus as an embodiment of a power conversion apparatus.

FIG. 1 is a block diagram illustrating a configuration example of a power supply apparatus 101 as an embodiment of a power conversion apparatus. The power supply apparatus 101 is, for example, a power supply system including a power supply circuit 10, a control unit 50, and a sensor unit 70. The power supply apparatus 101 is a system that is mounted on a vehicle such as an automobile and that distributes power to in-vehicle loads. Specific examples of the vehicle include a hybrid vehicle, a plug-in hybrid vehicle, and an electric automobile.

The power supply apparatus 101 includes, for example, a first input/output port 60a connected to a primary side high voltage system load (for example, an electric power steering apparatus (EPS)) 61a and a second input/output port 60c connected to a primary side low voltage system load (for example, an electronic control unit (ECU), an electronic control brake system (ECB), and the like) 61c as primary side ports.

The power supply apparatus 101 includes, for example, a third input/output port 60b connected to a secondary side high voltage system load 61b and a secondary side high voltage system power supply (for example, a main battery) 62b as a secondary side port. The secondary side high voltage system power supply 62b supplies power to the secondary side high voltage system load 61b operating in the same voltage system (for example, 288 V system higher than a 12 V system and a 48 V system) as the secondary side high voltage system power supply 62b. A specific example of the secondary side high voltage system power supply 62b is a secondary battery such as a lithium ion battery.

The power supply circuit 10 is a power conversion circuit that includes the aforementioned third input/output ports and that has a function of selecting two input/output ports out of the three input/output ports and performing power conversion between the selected two input/output ports. The power supply apparatus 101 including the power supply circuit 10 may be an apparatus that includes three or more input/output ports and that can convert power between any two input/output ports out of the three or more input/output ports.

Port power Pa, Pc, Pb are input/output power (input power or output power) at the first input/output port 60a, the second input/output port 60c, and the third input/output port 60b, respectively. Port voltages Va, Vc, Vb are input/output voltages (an input voltage or an output voltage) at the first input/output port 60a, the second input/output port 60c, and the third input/output port 60b, respectively. Port currents Ia, Ic, Ib are input/output currents (an input current or an output current) at the first input/output port 60a, the second input/output port 60c, and the third input/output port 60b, respectively.

The power supply circuit 10 includes a capacitor C1 disposed at the first input/output port 60a, a capacitor C3 disposed at the second input/output port 60c, and a capacitor C2 disposed at the third input/output port 60b. Specific examples of the capacitors C1, C2, C3 include a film capacitor, an aluminum electrolytic capacitor, a ceramic capacitor, and a solid polymer capacitor.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b.

The capacitors C1, C2, C3 may be disposed inside the power supply circuit 10 or may be disposed outside the power supply circuit 10.

The power supply circuit 10 is a power conversion circuit including the primary side conversion circuit 20 and the secondary side conversion circuit 30. Further, the primary side conversion circuit 20 and the secondary side conversion circuit 30 are connected to each other via a primary side magnetic coupling reactor 204 and a secondary side magnetic coupling reactor 304 and are magnetically coupled with a transformer 400 (center-tap transformer). The primary side ports including the first input/output port 60a and the second input/output port 60c and the secondary side port including the third input/output port 60b are connected to each other via the transformer 400.

The primary side conversion circuit 20 is a primary side circuit including a primary side full bridge circuit 200, the first input/output port 60a, and the second input/output port 60c. The primary side full bridge circuit 200 is a primary side power conversion unit including a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are, for example, switching elements including an N-channel MOSFET and a body diode as a parasitic element of the MOSFET. A diode may be additionally connected in parallel to the MOSFET.

The primary side full bridge circuit 200 includes a primary side positive electrode bus line 298 connected to the high potential side terminal 613 of the first input/output ports 60a and a primary side negative electrode bus line 299 connected to the low potential side terminal 614 of the first input/output port 60a and the second input/output port 60c.

A primary side first arm circuit 207 in which the primary side first upper arm U1 and the primary side first lower arm /U1 are connected in series is disposed between the primary side positive electrode bus line 298 and the primary side negative electrode bus line 299. The primary side first arm circuit 207 is a primary side first power conversion circuit unit (primary side U-phase power conversion circuit unit) that can perform a power conversion operation by ON/OFF switching operations of the primary side first upper arm U1 and the primary side first lower arm /U1. A primary side second arm circuit 211 in which the primary side second upper arm V1 and the primary side second lower arm /V1 are connected in series is disposed in parallel to the primary side first arm circuit 207 between the primary side positive electrode bus line 298 and the primary side negative electrode bus line 299. The primary side second arm circuit 211 is a primary side second power conversion circuit unit (primary side V-phase power conversion circuit unit) that can perform a power conversion operation by ON/OFF switching operations of the primary side second upper arm V1 and the primary side second lower arm /V1.

A bridge part connecting a midpoint 207m of the primary side first arm circuit 207 and a midpoint 211m of the primary side second arm circuit 211 is provided with the primary side coil 202 and the primary side magnetic coupling reactor 204. The connection relationship of the bridge part will be described below in more detail. The midpoint 207m of the primary side first arm circuit 207 is connected to one end of a primary side first reactor 204a of the primary side magnetic coupling reactor 204. The other end of the primary side first reactor 204a is connected to one end of the primary side coil 202. The other end of the primary side coil 202 is connected to one end of a primary side second reactor 204b of the primary side magnetic coupling reactor 204. The other end of the primary side second reactor 204b is connected to the midpoint 211m of the primary side second arm circuit 211. The primary side magnetic coupling reactor 204 includes the primary side first reactor 204a and the primary side second reactor 204b magnetically coupled to the primary side first reactor 204a with a coupling coefficient k1.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port disposed between the primary side positive electrode bus line 298 and the primary side negative electrode bus line 299. The first input/output port 60a includes the terminal 613 and the terminal 614. The second input/output port 60c is a port disposed between the primary side negative electrode bus line 299 and the center tap 202m of the primary side coil 202. The second input/output port 60c includes the terminal 614 and the terminal 616.

The center tap 202m is connected to the high potential side terminal 616 of the second input/output port 60c. The center tap 202m is an intermediate connecting point between a primary side first winding 202a and a primary side second winding 202b disposed in the primary side coil 202.

The secondary side conversion circuit 30 is a secondary side circuit including a secondary side full bridge circuit 300, and the third input/output port 60b. The secondary side full bridge circuit 300 is a secondary side power conversion unit including a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are, for example, switching elements including an N-channel MOSFET and a body diode as a parasitic element of the MOSFET. A diode may be additionally connected in parallel to the MOSFET.

The secondary side full bridge circuit 300 includes a secondary side positive electrode bus line 398 connected to the high potential side terminal 618 of the third input/output ports 60b and a secondary side negative electrode bus line 399 connected to the low potential side terminal 620 of the third input/output port 60b.

A secondary side first arm circuit 307 in which the secondary side first upper arm U2 and the secondary side first lower arm /U2 are connected in series is disposed between the secondary side positive electrode bus line 398 and the secondary side negative electrode bus line 399. The secondary side first arm circuit 307 is a secondary side first power conversion circuit unit (secondary side U-phase power conversion circuit unit) that can perform a power conversion operation by ON/OFF switching operations of the secondary side first upper arm U2 and the secondary side first lower arm /U2. A secondary side second arm circuit 311 in which the secondary side second upper arm V2 and the secondary side second lower arm /V2 are connected in series is disposed in parallel to the secondary side first arm circuit 307 between the secondary side positive electrode bus line 398 and the secondary side negative electrode bus line 399. The secondary side second arm circuit 311 is a secondary side second power conversion circuit unit (secondary side V-phase power conversion circuit unit) that can perform a power conversion operation by ON/OFF switching operations of the secondary side second upper arm V2 and the secondary side second lower arm /V2.

A bridge part connecting a midpoint 307m of the secondary side first arm circuit 307 and a midpoint 311m of the secondary side second arm circuit 311 is provided with the secondary side coil 302 and the secondary side magnetic coupling reactor 304. The connection relationship of the bridge part will be described below in more detail. The midpoint 307m of the secondary side first arm circuit 307 is connected to one end of a secondary side first reactor 304a of the secondary side magnetic coupling reactor 304. The other end of the secondary side first reactor 304a is connected to one end of the secondary side coil 302. The other end of the secondary side coil 302 is connected to one end of a secondary side second reactor 304b of the secondary side magnetic coupling reactor 304. The other end of the secondary side second reactor 304b is connected to the midpoint 311m of the secondary side second arm circuit 311. The secondary side magnetic coupling reactor 304 includes the secondary side first reactor 304a and the secondary side second reactor 304b magnetically coupled to the secondary side first reactor 304a with a coupling coefficient k2.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port disposed between the secondary side positive electrode bus line 398 and the secondary side negative electrode bus line 399. The third input/output port 60b includes the terminal 618 and the terminal 620.

The port voltage Vb of the third input/output port 60a varies depending on the voltage of the secondary side low voltage system power supply 62b.

In FIG. 1, the power supply apparatus 101 includes a sensor unit 70. The sensor unit 70 is a detection unit that detects an input/output value Y at at least one of the first to third input/output ports 60a, 60c, 60b with a predetermined detection cycle and that outputs a detected value Yd corresponding to the detected input/output value Y to the control unit 50. The detected value Yd may be a detected voltage obtained by detecting an input/output voltage, a detected current obtained by detecting an input/output current, or may be detected power obtained by detecting input/output power. The sensor unit 70 may be disposed inside the power supply circuit 10 or may be disposed outside the power supply circuit 10.

The sensor unit 70 includes, for example, a voltage detecting unit that detects an input/output voltage generated in at least one port of the first to third input/output ports 60a, 60c, 60b. The sensor unit 70 includes, for example, a primary side voltage detecting unit that outputs the detected voltage of at least one of the input/output voltage Va and the input/output voltage Vc as a primary side detected voltage value and a secondary side voltage detecting unit that outputs the detected voltage of the input/output voltage Vb as a secondary side detected voltage value.

The voltage detecting unit of the sensor unit 70 includes, for example, a voltage sensor that monitors the input/output voltage value of at least one port and a voltage detection circuit that outputs a detected voltage corresponding to the input/output voltage value monitored by the voltage sensor to the control unit 50.

The sensor unit 70 includes, for example, a current detecting unit that detects an input/output current flowing in at least one port of the first to third input/output ports 60a, 60c, 60b. The sensor unit 70 includes, for example, a primary side current detecting unit that outputs the detected current of at least one of the input/output current Ia and the input/output current Ic as a primary side detected current value and a secondary side current detecting unit that outputs the detected current of the input/output current Ib as a secondary side detected current value.

The current detecting unit of the sensor unit 70 includes, for example, a current sensor that monitors the input/output current value of at least one port and a current detection circuit that outputs a detected current corresponding to the input/output current value monitored by the current sensor to the control unit 50.

The power supply apparatus 101 includes the control unit 50. The control unit 50 is, for example, an electronic circuit including a micro computer having a CPU built therein. The control unit 50 may be disposed inside the power supply circuit 10 or may be disposed outside the power supply circuit 10.

The control unit 50 controls the power conversion operation performed by the power supply circuit 10 in a feedback manner by changing the value of a predetermined control parameter X, and can adjust the input/output values Y at the first to third input/output ports 60a, 60c, 60b of the power supply circuit 10. Examples of the main control parameter X include two types of control parameters of a phase difference φ and a duty ratio D (ON time δ).

The phase difference φ is a difference in switching timing (time lag) between the power conversion circuit units of the same phase in the primary side full bridge circuit 200 and the secondary side full bridge circuit 300. The duty ratio D (ON time δ) is a duty ratio (ON time) of a switching waveform in the power conversion circuit units in the primary side full bridge circuit 200 and the secondary side full bridge circuit 300.

These two control parameters X can be controlled independently of each other. The control unit 50 changes the input/output values Y at the input/output ports of the power supply circuit 10 by duty ratio control and/or phase control of the primary side full bridge circuit 200 and the secondary side full bridge circuit 300 using the phase difference φ and the duty ratio D (ON time δ).

The control unit 50 controls the power conversion operation of the power supply circuit 10 in a feedback manner to make the phase difference φ or the duty ratio D become a value so that the detected value Yd of the input/output value Y in at least one port of the first to third input/output ports 60a, 60c, 60b converges on a target value Yo set at the port. The target value Yo is a command value set by the control unit 50 or a predetermined apparatus other than the control unit 50, for example, on the basis of drive conditions defined for each load (for example, the primary side low voltage system load 61c) connected to the respective input/output ports. The target value Yo serves as an output target value when electric power is output from the port, serves as an input target value when electric power is input to the port, and may be a target voltage value, may be a target current value, or may be a target power value.

Further, the control unit 50 controls the power conversion operation of the power supply circuit 10 in a feedback manner to make the phase difference φ become a value so that transmission power P transmitted via the transformer 400 between the primary side conversion circuit 20 and the secondary side conversion circuit 30 converges on preset target transmission power. The transmission power is also referred to as an amount of power transmitted. The target transmission power is a command value set by the control unit 50 or a predetermined apparatus other than the control unit 50, for example, on the basis of the difference between the detected value Yd and the target value Yo at a certain port.

Figure 2:
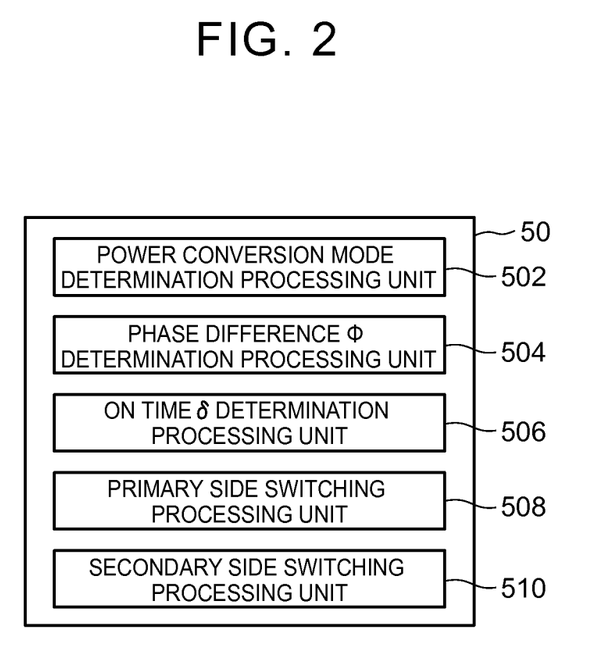
FIG. 2 is a block diagram illustrating a configuration example of a control unit.

FIG. 2 is a block diagram of the control unit 50. The control unit 50 is a control unit having a function of controlling switching of the switching elements such as the primary side first upper arm U1 of the primary side conversion circuit 20 and the switching elements such as the secondary side first upper arm U2 of the secondary side conversion circuit 30. The control unit 50 includes a power conversion mode determination processing unit 502, a phase difference φ determination processing unit 504, an ON time δ determination processing unit 506, a primary side switching processing unit 508, and a secondary side switching processing unit 510. The control unit 50 is, for example, an electronic circuit including a micro computer having a CPU built therein.

The power conversion mode determination processing unit 502 selects and determines an operation mode out of power conversion modes A to F, which will be described below, of the power supply circuit 10, for example, on the basis of a predetermined external signal (for example, a signal indicating a difference between the detected value Yd and the target value Yo at a certain port). The power conversion modes include mode A in which electric power input from the first input/output port 60a is converted and output to the second input/output port 60c, and mode B in which electric power input from the first input/output port 60a is converted and output to the third input/output port 60b.

The power conversion modes include mode C in which electric power input from the second input/output port 60c is converted and output to the first input/output port 60a, and mode D in which electric power input from the second input/output port 60c is converted and output to the third input/output port 60b.

The power conversion modes include mode E in which electric power input from the third input/output port 60b is converted and output to the first input/output port 60a, and mode F in which electric power input from the third input/output port 60b is converted and output to the second input/output port 60c.

The phase difference φ determination processing unit 504 has a function of setting the phase difference φ of periodic switching movement of the switching elements between the primary side conversion circuit 20 and the secondary side conversion circuit 30 so as to cause the power supply circuit 10 to serve as a DC-DC converter circuit.

The ON time δ determination processing unit 506 has a function of setting the ON time δ of the switching elements of the primary side conversion circuit 20 and the secondary side conversion circuit 30 so as to cause the primary side conversion circuit 20 and the secondary side conversion circuit 30 to serve as step-up/step-down circuits, respectively.

The primary side switching processing unit 508 has a function of controlling switching of the switching elements of the primary side first upper arm U1, the primary side first lower arm /U1, the primary side second upper arm V1, and the primary side second lower arm /V1 on the basis of the outputs of the power conversion mode determination processing unit 502, the phase difference φ determination processing unit 504, and the ON time δ determination processing unit 506.

The secondary side switching processing unit 510 has a function of controlling switching of the switching elements of the secondary side first upper arm U2, the secondary side first lower arm /U2, the secondary side second upper arm V2, and the secondary side second lower arm /V2 on the basis of the outputs of the power conversion mode determination processing unit 502, the phase difference φ determination processing unit 504, and the ON time δ determination processing unit 506.

The control unit 50 is not limited to the processes illustrated in FIG. 2 and can perform various processes required for controlling the transmission power transmitted between the primary side conversion circuit 20 and the secondary side conversion circuit 30.

Operation of Power Supply Apparatus 101

The operation of the power supply apparatus 101 will be described below with reference to FIGS. 1 and 2. For example, when an external signal for requiring for selecting mode D as the power conversion mode of the power supply circuit 10 is input, the power conversion mode determination processing unit 502 of the control unit 50 determines the power conversion mode of the power supply circuit 10 to be mode D. At this time, the voltage input to the second input/output port 60c is stepped up by the step-up function of the primary side conversion circuit 20, the power of the stepped-up voltage is transmitted to the third input/output port 60b by the function as the DC-DC converter circuit of the power supply circuit 10, the transmitted power is stepped down by the step-down function of the secondary side conversion circuit 30, and the stepped-down voltage is output from the third input/output port 60b.

The step-up/step-down function of the primary side conversion circuit 20 will be described below in detail. Paying attention to the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Since both ends of the primary side first arm circuit 207 are connected to the first input/output port 60a, a step-up/step-down circuit is disposed between the terminal 616 of the second input/output port 60c and the first input/output port 60a.

Further, the terminal 616 of the second input/output port 60c is connected to the midpoint 211m of the primary side second arm circuit 211 via the primary side second winding 202b and the primary side second reactor 204b connected in series to the primary side second winding 202b. Since both ends of the primary side second arm circuit 211 are connected to the first input/output port 60a, a step-up/step-down circuit is disposed in parallel between the terminal 616 of the second input/output port 60c and the first input/output port 60a. Further, since the secondary side conversion circuit 30 has substantially the same configuration as the primary side conversion circuit 20, the secondary side conversion circuit 30 has a step-up/step-down function similarly to the primary side conversion circuit 20.

The function as the DC-DC converter circuit of the power supply circuit 10 will be described below in detail. Paying attention to the first input/output port 60a and the third input/output port 60b, the first input/output port 60a is connected to the primary side full bridge circuit 200 and the third input/output port 60b is connected to the secondary side full bridge circuit 300. The primary side coil 202 disposed in the bridge part of the primary side full bridge circuit 200 and the secondary side coil 302 disposed in the bridge part of the secondary side full bridge circuit 300 are magnetically coupled to each other with a coupling coefficient kT, whereby the transformer 400 serves as a center-tap transformer with a turns ratio of 1:N. Accordingly, by adjusting the phase difference φ of the periodic switching movements of the switching elements of the primary side full bridge circuit 200 and the secondary side full bridge circuit 300, the electric power input to the first input/output port 60a can be converted and transmitted to the third input/output port 60b, or the electric power input to the third input/output port 60b can be converted and transmitted to the first input/output port 60a.

Figure 3:
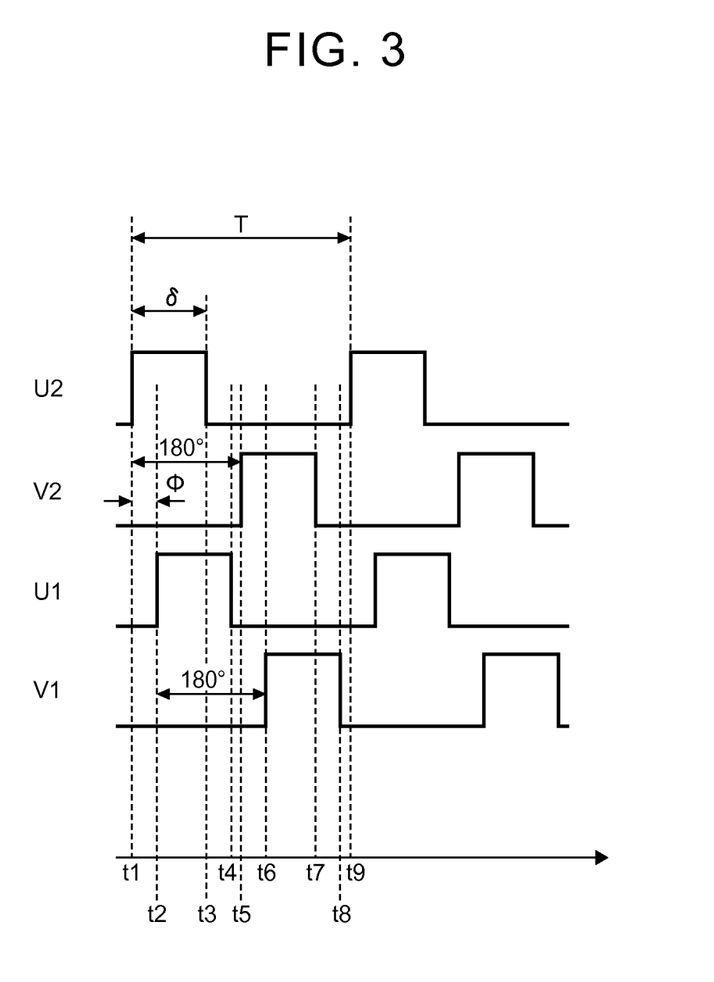
FIG. 3 is a timing diagram illustrating a switching example of a primary side circuit and a secondary side circuit.

FIG. 3 is a timing diagram illustrating ON/OFF switching waveforms of the arms disposed in the power supply circuit 10 under the control of the control unit 50. In FIG. 3, U1 represents the ON/OFF waveform of the primary side first upper arm U1, V1 represents the ON/OFF waveform of the primary side second upper arm V1, U2 represents the ON/OFF waveform of the secondary side first upper arm U2, and V2 represents the ON/OFF waveform of the secondary side second upper arm V2. The ON/OFF waveforms of the primary side first lower arm /U1, the primary side second lower arm /V1, the secondary side first lower arm /U2, and the secondary side second lower arm /V2 are waveforms (not illustrated) obtained by inverting the ON/OFF waveforms of the primary side first upper arm U1, the primary side second upper arm V1, the secondary side first upper arm U2, and the secondary side second upper arm V2, respectively. A dead time can be disposed between both ON and OFF waveforms of the upper and lower arms so that a penetration current does not flow at the time turning on both of the upper and lower arms. In FIG. 3, the high level represents the ON state and the low level represents the OFF state.

By changing the ON times δ of U1, V1, U2, V2, it is possible to change the step-up/step-down ratio of the primary side conversion circuit 20 and the secondary side conversion circuit 30. For example, by setting the ON times δ of the U1, V1, U2, V2 to be equal to each other, the step-up/step-down ratio of the primary side conversion circuit 20 and the step-up/step-down ratio of the secondary side conversion circuit 30 can be set to be equal to each other.

The ON time δ determination processing unit 506 sets the ON times δ of U1, V1, U2, V2 to be equal to each other so that the step-up/step-down ratios of the primary side conversion circuit 20 and the secondary side conversion circuit 30 are equal to each other (ON time δ=primary side ON time δ11=secondary side ON time δ12=time value β).

The step-up/step-down ratio of the primary side conversion circuit 20 is determined depending on the duty ratio D which is the ratio of the ON time δ to the switching period T of the switching element (arm) disposed in the primary side full bridge circuit 200. Similarly, the step-up/step-down ratio of the secondary side conversion circuit 30 is determined depending on the duty ratio D which is the ratio of the ON time δ to the switching period T of the switching element (arm) disposed in the secondary side full bridge circuit 300. The step-up/step-down ratio of the primary side conversion circuit 20 is a transformation ratio between the first input/output port 60a and the second input/output port 60c.

Accordingly, for example, step-up/step-down ratio of the primary side conversion circuit 20=voltage of the second input/output port 60c/voltage of the first input/output port 60a=δ11/T=βT and step-up/step-down ratio of the secondary side conversion circuit 30=δ12/T=βT are established. That is, the step-up/step-down ratio of the primary side conversion circuit 20 and the step-up/step-down ratio of the secondary side conversion circuit 30 have the same value (=β/T).

The ON time δ illustrated in FIG. 3 represents the ON time δ11 of the primary side first upper arm U1 and the primary side second upper arm V1, and represents the ON time δ12 of the secondary side first upper arm U2 and the secondary side second upper arm V2. The switching period T of the arm disposed in the primary side full bridge circuit 200 and the switching period T of the arm disposed in the secondary side full bridge circuit 300 are the same time.

The phase difference between U1 and V1 is set to 180 degrees (π) and the phase difference between U2 and V2 is set to 180 degrees (π). By changing the phase difference φ between U1 and U2, it is possible to adjust the amount of power transmitted P between the primary side conversion circuit 20 and the secondary side conversion circuit 30. The electric power can be transmitted from the primary side conversion circuit 20 to the secondary side conversion circuit 30 when the phase difference φ>0 is established, and the electric power can be transmitted from the secondary side conversion circuit 30 to the primary side conversion circuit 20 when the phase difference φ<0 is established.

The phase difference φ is a difference in switching timing (time lag) between the power conversion circuit units of the same phase in the primary side full bridge circuit 200 and the secondary side full bridge circuit 300. For example, the phase difference φ is a difference in switching timing between the primary side first arm circuit 207 and the secondary side first arm circuit 307, and is a difference in switching timing between the primary side second arm circuit 211 and the secondary side second arm circuit 311. The differences are controlled to the same state. That is, the phase difference φ between U1 and U2 and the phase difference φ between V1 and V2 are controlled to the same value.

Therefore, for example, when an external signal for requiring for selecting mode F as the power conversion mode of the power supply circuit 10 is input, the power conversion mode determination processing unit 502 determines that mode F is selected. The ON time δ determination processing unit 506 sets the ON time δ for defining the step-up ratio when the primary side conversion circuit 20 is caused to serve as a step-up circuit stepping up the voltage input to the second input/output port 60*c* and outputs the stepped-up voltage to the first input/output port 60*a*. The secondary side conversion circuit 30 serves as a step-down circuit stepping down the voltage input to the third input/output port 60*b* at the step-down ratio defined by the ON time δ set by the ON time δ determination processing unit 506. The phase difference φ determination processing unit 504 sets the phase difference φ for transmitting the electric power input to the first input/output port 60*a* to the third input/output port 60*b* by a desired amount of power transmitted P.

The primary side switching processing unit 508 controls the switching of the switching elements of the primary side first upper arm U1, the primary side first lower arm /U1, the primary side second upper arm V1, and the primary side second lower arm /V1 so that the primary side conversion circuit 20 serves as a step-up circuit and the primary side conversion circuit 20 serves as a part of the DC-DC converter circuit.

The secondary side switching processing unit 510 controls the switching of the switching elements of the secondary side first upper arm U2, the secondary side first lower arm /U2, the secondary side second upper arm V2, and the secondary side second lower arm /V2 so that the secondary side conversion circuit 30 serves as a step-down circuit and the secondary side conversion circuit 30 serves as a part of the DC-DC converter circuit.

As described above, the primary side conversion circuit 20 and the secondary side conversion circuit 30 can serve as a step-up circuit or a step-down circuit and the power supply circuit 10 can serve as a bidirectional DC-DC converter circuit. Accordingly, the power conversion can be performed in all the power conversion modes A to F, that is, the power conversion can be performed between two selected input/output ports out of three input/output ports.

The transmission power P (also referred to as amount of power transmitted P) adjusted depending on the phase difference φ, equivalent inductance L, and the like by the control unit 50 is electric power transmitted from one conversion circuit of the primary side conversion circuit 20 and the secondary side conversion circuit 30 to the other conversion circuit via the transformer 400, and is expressed by Expression (1), $P=(N \times Va \times Vb)/(\pi \times \omega \times L) \times F(D, \phi)$.

Here, N represents the turns ratio of the transformer 400, Va represents the input/output voltage of the first input/output port 60*a* (the voltage between the primary side positive electrode bus line 298 and the primary side negative electrode bus line 299 of the primary side conversion circuit 20), and Vb represents the input/output voltage of the third input/output port 60*b* (the voltage between the secondary side positive electrode bus line 398 and the secondary side negative electrode bus line 399 of the secondary side conversion circuit 30). π represents the circular constant and ω ($=2\pi \times f=2\pi/T$) represents the angular frequency of the switching of the primary side conversion circuit 20 and the secondary side conversion circuit 30. f represents the switching frequency of the primary side conversion circuit 20 and the secondary side conversion circuit 30, T represents the switching period of the primary side conversion circuit 20 and the secondary side conversion circuit 30, and L represents the equivalent inductance associated with the transmission of electric power of the magnetic coupling reactors 204, 304 and the transformer 400. F(D, φ) is a function having the duty ratio D and the phase difference φ as parameters and is a parameter monotonously increasing with the increase in the phase difference φ without depending on the duty ratio D. The duty ratio D and the phase difference φ are control parameters designed to vary within a range of predetermined upper and lower limits.

The equivalent inductance L can be defined in an equivalent circuit of the transformer 400 connected to the primary side magnetic coupling reactor 204 and/or the secondary side magnetic coupling reactor 304. The equivalent inductance L is combined inductance obtained by combining leakage inductance of the primary side magnetic coupling reactor 204 and/or the leakage inductance of the secondary side magnetic coupling reactor 304 and the leakage inductance of the transformer 400 in the simple equivalent circuit.

For example, the equivalent inductance L (secondary side converted value $L_{EQ2}$) measured from the secondary side conversion circuit 30 can be expressed by Expression (2), $L_{EQ2}=2L_1(1-k_1)N^2+2L_2(1-k_2)+L_{T2}(1-k_T^2)$.

$L_1$ represents the self inductance of the primary side magnetic coupling reactor 204, $k_1$ represents the coupling coefficient of the primary side magnetic coupling reactor 204, N represents the turns ratio of the transformer 400, $L_2$ represents the self inductance of the secondary side magnetic coupling reactor 304, $k_2$ represents the coupling coefficient of the secondary side magnetic coupling reactor 304, $L_{T2}$ represents the exciting inductance on the secondary side of the transformer 400, and $k_T$ represents the coupling coefficient of the transformer 400. When the second input/output port 60*c* is not used, the leakage inductance appearing in the first term or the second term in Expression (2) may be absent.

However, the transmission power P that is adjusted by changing the phase difference φ by the control unit 50 is also affected by the duty ratio D. Specifically, according to whether there is a state where the duty ratio D wraps (overlaps) or not, an increase or decrease of the transmission power P may vary due to a change of the phase difference φ.

Figure 4A:
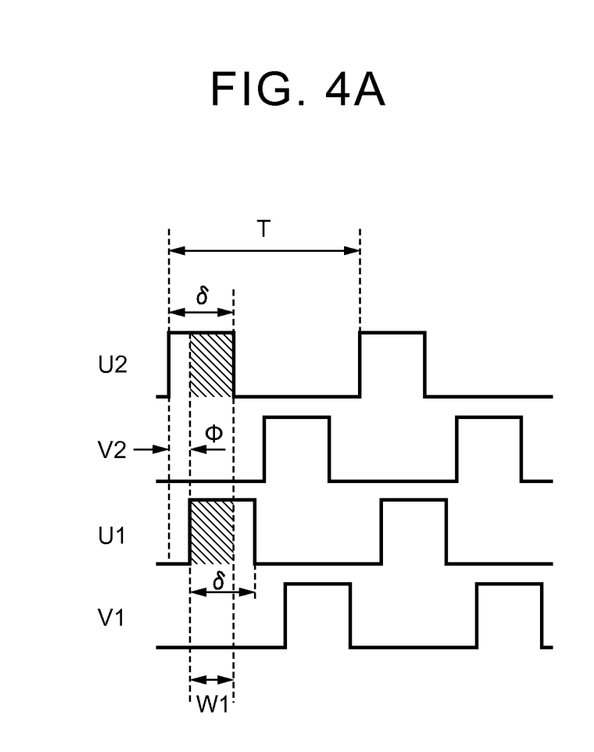
FIG. 4A is a timing diagram illustrating a switching example of the primary side circuit and the secondary side circuit.
Figure 4B:
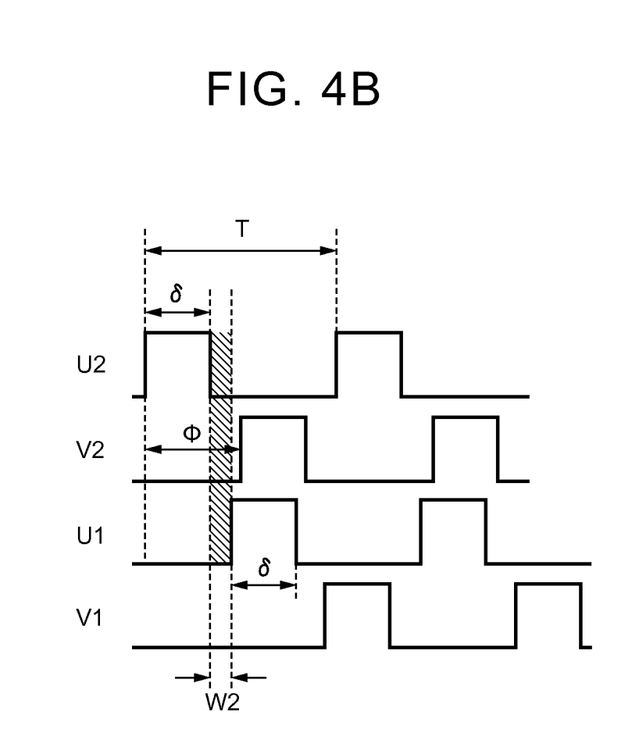
FIG. 4B is a timing diagram illustrating a switching example of the primary side circuit and the secondary side circuit.

FIG. 4 is a timing diagram illustrating ON/OFF switching waveforms of the arms (the secondary side first upper arm U2, the secondary side second upper arm V2, the primary side first upper arm U1, and the primary side second upper arm V1) disposed in the power supply circuit 10 under the control of the control unit 50.

In a period W1 shown in FIG. 4(A), the ON time of the switching element of the primary side conversion circuit and the ON time of the switching element of the secondary conversion circuit overlap (see the hatched portion). That is, there is a state where the duty ratio D wraps, and the transmission power P becomes larger as the phase difference φ increases. In principle, until the phase difference φ reaches 90 degrees, the transmission power P becomes larger as the phase difference φ increases.

In a period W2 shown in FIG. 4(B), the ON time of the switching element of the primary side conversion circuit and the ON time of the switching element of the secondary conversion circuit do not overlap (see the hatched portion).

That is, there is no state where the duty ratio D wraps, and the transmission power P becomes smaller as the phase difference φ increases. This is because a circulating current that is not caused by the power transmission may circulate wastefully in the circuit.

In other words, if the ON time of the switching element of the primary side conversion circuit and the ON time of the switching element of the secondary conversion circuit are not appropriately set (there is no state where the duty ratio D wraps), the transmission power P become smaller even the phase difference φ increases.

Therefore, the control unit 50 appropriately sets a duty ratio D1 of the primary side conversion circuit 20 and a duty ratio D2 of the secondary side conversion circuit 30 to suppress the decrease of the transmission power.

Figure 5:
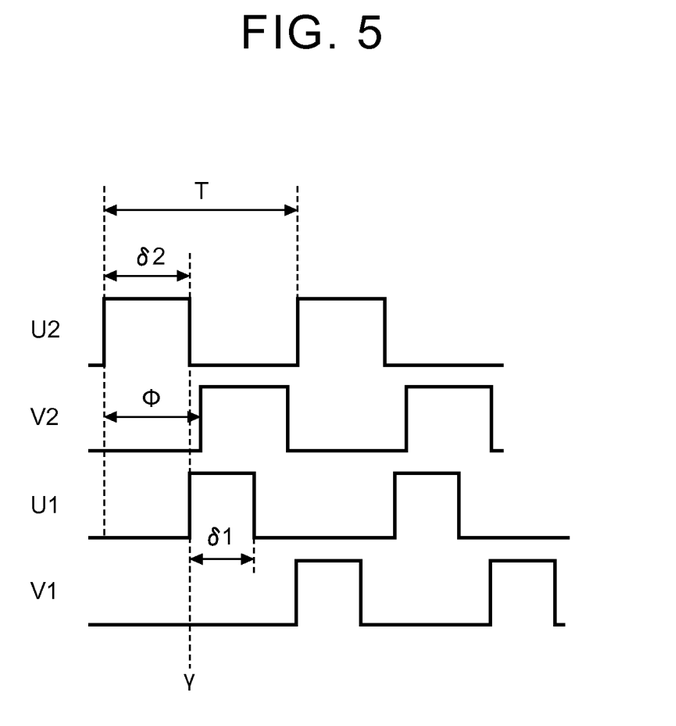
FIG. 5 is a timing diagram illustrating a switching example of the primary side circuit and the secondary side circuit.

For example, when the phase difference φ is equal to or less than 90 degrees and a relationship of (phase difference φ/360 degrees)>(ON time δ/switching period T=duty ratio D) is established, the control unit 50 sets the duty ratio D1 of the primary side conversion circuit 20 to the duty ratio D (PID calculated value), and sets the duty ratio D2 of the secondary side conversion circuit 30 to be equal to or greater than a value obtained by dividing the phase difference φ by 360 degrees (the phase difference φ/360 degrees). By performing this setting by the control unit 50, as shown in FIG. 5, the start of the ON time (for example, δ1) of the switching element of the primary side conversion circuit 20 and the end of the ON time (for example, δ2) of the switching element of the secondary conversion circuit 30 can overlap (see γ-axis in FIG. 5).

That is, even the phase difference φ increases (until it reaches 90 degrees), the control unit 50 can increase the transmission power P in proportion to the phase difference φ by setting the duty ratio D2 of the secondary side conversion circuit 30 such that there is a period during which the ON time of the switching element of the primary side conversion circuit and the ON time of the switching element of the secondary conversion circuit overlap. In addition, it can set the duty ratio D1 of the primary side conversion circuit 20 to be equal to or greater than the value obtained by dividing the phase difference φ by 360 degrees (the phase difference φ/360 degrees), and set the duty ratio D2 of the secondary side conversion circuit 30 to the duty ratio D (PID calculated value).

Further, for example, when the phase difference φ is equal to or less than 90 degrees and a relationship of (phase difference φ/360 degrees)≤(ON time δ/switching period T=duty ratio D) is established, the control unit 50 sets the duty ratio D1 of the primary side conversion circuit 20 and the duty ratio D2 of the secondary side conversion circuit 30 to the duty ratio D (PID calculated value).

Here, the setting of the duty ratio D1 of the primary side conversion circuit 20 and the duty ratio D2 of the secondary side conversion circuit 30 will be described with a specific example.

A case where the phase difference φ is 100 degrees is taken into consideration. In this case, the control unit 50 makes the phase difference φ be fixed to 90 degrees forcibly in order that the phase difference φ is greater than 90 degrees.

For example, when the duty ratio D is 0.2, for the relationship of (phase difference φ/360 degrees)>(ON time δ/switching period T=duty ratio D), in order to establish that 0.25>0.2, the control unit 50 sets the duty ratio D1 of the primary side conversion circuit 20 to 0.2 (PID calculated value) and sets the duty ratio D2 of the secondary side conversion circuit 30 to 0.25.

For example, when the duty ratio D is 0.3, for the relationship of (phase difference φ/360 degrees)>(ON time δ/switching period T=duty ratio D), in order to establish that 0.25≤0.30, the control unit 50 sets the duty ratio D1 of primary side conversion circuit 20 and the duty ratio D2 of the secondary side conversion circuit 30 to 0.3 (PID calculated value).

Figure 6:
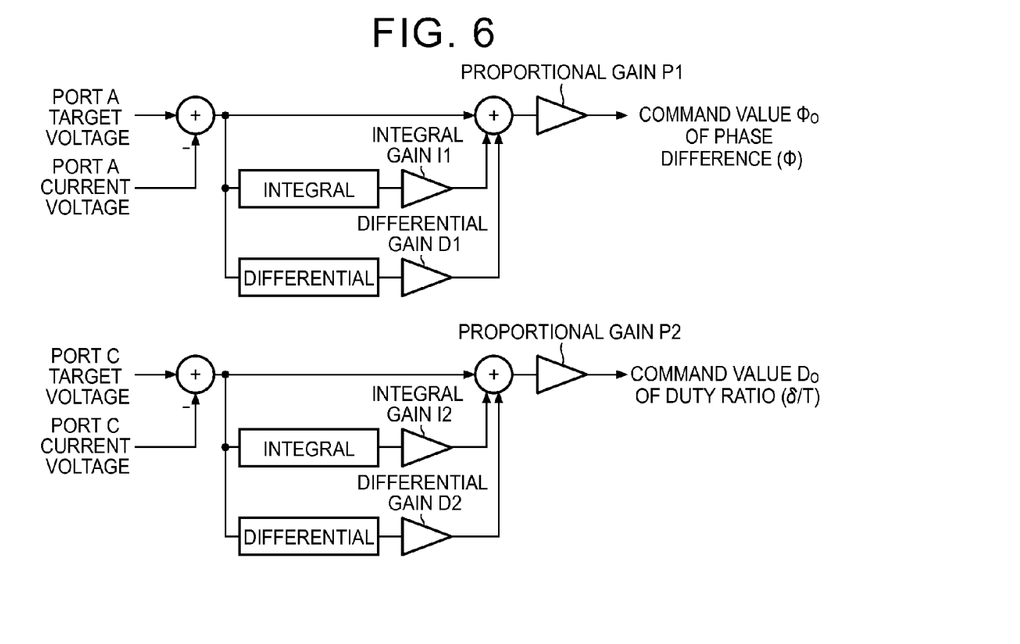
FIG. 6 is a block diagram illustrating a configuration example of the control unit.

FIG. 6 is a block diagram illustrating a configuration example of the control unit 50 which calculates the PID calculated value. The control unit 50 includes a PID control unit 51, and the like. The PID calculated value is, for example, a command value φo of the phase difference φ, a command value Do of the duty ratio D.

The PID control unit 51 includes a phase difference command value generation unit that generates a command value φo of the phase difference φ for causing the port voltage of at least one port out of the primary side ports and the secondary side ports to converge on the target voltage by PID control for each switching period T. For example, the phase difference command value generation unit of the PID control unit 51 generates a command value φo for causing the difference to converge on zero for each switching period T by performing the PID control on the basis of the difference between the target voltage of the port voltage Va and the detected voltage of the port voltage Va acquired by the sensor unit 70.

The control unit 50 adjusts the transmission power P determined by Expression (1) by performing the switching control of the primary side conversion circuit 20 and the secondary side conversion circuit 30 on the basis of the command value φo generated by the PID control unit 51 so that the port voltage converges on the target voltage.

The PID control unit 51 includes a duty ratio value generation unit that generates a command value Do of the duty ratio D for causing the port voltage of at least one port out of the primary side ports and the secondary side ports to converge on the target voltage by the PID control for each switching period T. For example, the duty ratio command value generation unit of the PID control unit 51 generates a command value Do for causing the difference to converge on zero for each switching period T by performing the PID control on the basis of the difference between the target voltage of the port voltage Vc and the detected voltage of the port voltage Vc acquired by the sensor unit 70.

The PID control unit 51 may include an ON time command value generation unit generating a command value δo of the ON time δ instead of the command value Do of the duty ratio D.

The PID control unit 51 adjusts the command value φo of the phase difference φ on the basis of an integral gain I1, a differential gain D1, and a proportional gain P1, and adjusts the command value Do of the duty ratio D on the basis of an integral gain I2, a differential gain D2, and a proportional gain P2.

In addition, a relationship of port voltage Va×duty ratio D=port voltage Vc is established among the port voltage Va, the port voltage Vc, and the duty ratio D. Accordingly, when it is wanted to step down the constant port voltage Va (for example, 10 V) to increase the port voltage Vc (for example, from 1 V to 5 V), the duty ratio D can be increased (for example, from 10% to 50%). On the contrary, when it is wanted to step up the constant port voltage Vc (for example, 5 V) to increase the port voltage Va (for example, from 10 V to 50 V), the duty ratio D can be decreased (for example, from 50% to 10%). That is, the PID control unit 51 inverts the control direction of the duty ratio D (the direction in which the duty ratio D increases or decreases) in the step-up operation and the step-down operation by switching the control target (the first input/output port 60*a* or the second input/output port 60*c*).

Operation Flow of Power Supply Apparatus 101

Figure 7:
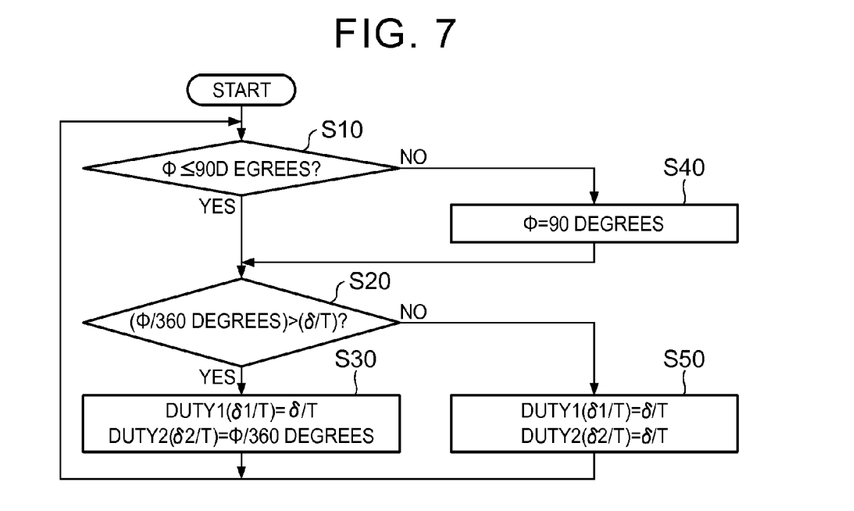
FIG. 7 is a flowchart illustrating an example of a power conversion method.

FIG. 7 is a flowchart illustrating an example of the power conversion method. The power conversion method illustrated in FIG. 7 is performed by the control unit 50.

In step S10, the control unit 50 determines whether the phase difference φ is equal to or less than 90 degrees. When the phase difference φ is equal to or less than 90 degrees (YES), the control unit 50 performs the processing of step S20. When the phase difference φ is larger than 90 degrees (NO), the control unit 50 performs the processing of step S40.

With the determination in step S10, the control unit 50 can determine whether it is in a state capable of performing a power transmission between the primary side conversion circuit 20 and the secondary side conversion circuit 30.

In step S20, the control unit 50 determines whether the phase difference φ/360 degrees (the value obtained by dividing the phase difference φ by 360 degrees) is greater than the ON time δ/the switching period T (=the duty ratio D (PID calculated value)). When the Phase difference φ/360 degrees is greater than the duty ratio D (YES), the control unit 50 performs the processing of step S30. When the phase difference φ/360 degrees is equal to or less than the duty ratio D (NO), the control unit 50 performs the processing of step S50.

With the determination in step S20, the control unit 50 can determine whether there is a period during which the ON time of the switching element of the primary side conversion circuit 20 and the ON time of the switching element of the secondary conversion circuit 30 overlap (whether there is a state where the duty ratio wraps).

In step S30, the control unit 50 sets the duty ratio D1 of the primary side conversion circuit 20 to the duty ratio D (PID calculated value), sets the duty ratio D2 of the secondary side conversion circuit 30 to be equal to or greater than the value obtained by dividing the phase difference φ by 360 degrees, and the process returns to step S10 again.

In step S40, the control unit 50 makes the phase difference φ be fixed to 90 degrees forcibly.

In step S50, the control unit 50 sets the duty ratio D1 of the primary side conversion circuit 20 and the duty ratio D2 of the secondary side conversion circuit 30 to the duty ratio D (PID calculated value), and the process returns to step S10 again.

As described above, the control unit 50 appropriately sets the duty ratio D1 of the primary side conversion circuit 20 and the duty ratio D2 of the secondary side conversion circuit 30 based on the determinations in step S10 and step S20. Thus, it is possible to prevent a circulating current that is not caused by the power transmission from circulating wastefully in the circuit, thereby to suppress the decrease of the transmission power.

While the power conversion apparatus and the power conversion method have been described with reference to the embodiment, the invention is not limited to the aforementioned embodiment. Various modifications and improvements such as combination or replacement of a part or all of other embodiments can be made without departing from the scope of the invention.

For example, in the aforementioned embodiment, a MOSFET as a semiconductor element that is turned on or off has been used as an example of the switching element. However, the switching element may be a voltage-controller power element using an insulating gate such as an IGBT or a MOSFET or may be a bipolar transistor.

The secondary side may be defined as the primary side and the primary side may be defined as the secondary side.

The invention can be applied to a power conversion apparatus that includes three or more input/output ports and that can convert electric power between two input/output ports out of the three or more input/output ports.

What is claimed is:

1. A power conversion method of a power conversion apparatus including a plurality of primary side ports disposed in a primary side circuit and a secondary side port disposed in a secondary side circuit that is magnetically coupled to the primary side circuit through a transformer, the power conversion method adjusting transmission power by changing a phase difference between switching of the primary side circuit and switching of the secondary side circuit, the transmission power being transmitted and adjusted between the primary side circuit and the secondary side circuit, the power conversion method changing a first duty ratio of the switching of the primary side circuit or a second duty ratio of the switching of the secondary side circuit, the power conversion method comprising:
   determining whether a value obtained by dividing the phase difference by 360 degrees is greater than a third duty ratio; and
   setting the second duty ratio of the secondary side circuit to be equal to or greater than the value obtained by dividing the phase difference by 360 degrees when the value obtained by dividing the phase difference by 360 degrees is greater than the third duty ratio.

2. The power conversion method according to claim 1, further comprising
   determining whether the phase difference is equal to or less than 90 degrees; and
   setting the second duty ratio of the secondary side circuit to be equal to or greater than the value obtained by dividing the phase difference by 360 degrees when the phase difference is equal to or less than 90 degrees and the value obtained by dividing the phase difference by 360 degrees is greater than the third duty ratio.

3. The power conversion method according to claim 2, further comprising
   making the phase difference be fixed to 90 degrees when the phase difference is greater than 90 degrees.

4. The power conversion method according to claim 1, further comprising
   setting the first duty ratio of the primary side circuit and the second duty ratio of the secondary side circuit to the third duty ratio when the value obtained by dividing the phase difference by 360 degrees is equal to or less than the third duty ratio.

5. The power conversion method according to claim 1, wherein
   the third duty ratio is a PID calculated value.

6. A power conversion apparatus comprising:
   a primary side circuit including a plurality of primary side ports;
   a secondary side circuit including a secondary side port and being magnetically coupled to the primary side circuit with a transformer; and
   a control unit configured to control transmission power that is to be transmitted between the primary side circuit and the secondary side circuit by changing a phase difference between switching of the primary side circuit and switching of the secondary side circuit, and control a first duty ratio of the switching of the primary side circuit or a second duty ratio of the switching of the secondary side circuit, wherein the control unit is configured to determine whether a value obtained by dividing the phase difference by 360 degrees is greater than a third duty ratio; and set the second duty ratio of the secondary side circuit to be equal to or greater than the value obtained by dividing the phase difference by 360 degrees when the value obtained by dividing the phase difference by 360 degrees is greater than the third duty ratio.

7. The power conversion apparatus according to claim 6, wherein the control unit is configured to determine whether the phase difference is equal to or less than 90 degrees, and to set the second duty ratio of the secondary side circuit to be equal to or greater than the value obtained by dividing the phase difference by 360 degrees when the phase difference is equal to or less than 90 degrees and the value obtained by dividing the phase difference by 360 degrees is greater than the third duty ratio.

8. The power conversion apparatus according to claim 7, wherein the control unit is configured to make the phase difference be fixed to 90 degrees when the phase difference is greater than 90 degrees.

9. The power conversion apparatus according to claim 6, wherein the control unit is configured to set the first duty ratio of the primary side circuit and the second duty ratio of the secondary side circuit to the third duty ratio when the value obtained by dividing the phase difference by 360 degrees is equal to or less than the third duty ratio.

10. The power conversion apparatus according to claim 6, wherein the third duty ratio is a PID calculated value.

* * * * *